United States Patent
Knigge et al.

(10) Patent No.: US 8,169,743 B2
(45) Date of Patent: May 1, 2012

(54) MINIMIZING SLIDER VIBRATION EFFECTS ON A MAGNETIC TRANSDUCER

(75) Inventors: Bernhard Knigge, San Jose, CA (US); Oscar Ruiz, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1097 days.

(21) Appl. No.: 11/880,220

(22) Filed: Jul. 20, 2007

(65) Prior Publication Data
US 2009/0021865 A1 Jan. 22, 2009

(51) Int. Cl.
*G11B 5/60* (2006.01)
(52) U.S. Cl. .................................... 360/234.6
(58) Field of Classification Search ............ 360/234.6, 360/234.5, 234.7
See application file for complete search history.

(56) References Cited

U.S. PATENT DOCUMENTS

| | | | |
|---|---|---|---|
| 5,189,574 A * | 2/1993 | Imamura et al. ........... 360/234.2 |
| 5,359,479 A | 10/1994 | Karam, II |
| 5,367,419 A * | 11/1994 | Kazama ...................... 360/245.7 |
| 5,467,237 A * | 11/1995 | Takahashi .................... 369/13.1 |
| 5,721,649 A | 2/1998 | Ye et al. |
| 5,777,824 A | 7/1998 | Gray |
| 5,825,593 A | 10/1998 | Mowry |
| 5,850,320 A * | 12/1998 | Warmka et al. ............. 360/245.2 |
| 5,949,614 A * | 9/1999 | Chhabra ..................... 360/235.6 |
| 6,088,192 A * | 7/2000 | Riener et al. ................ 360/266.1 |
| 6,227,042 B1 * | 5/2001 | Ruiz ............................... 73/105 |
| 6,278,581 B1 | 8/2001 | Egawa et al. |
| 6,333,836 B1 * | 12/2001 | Boutaghou et al. ......... 360/235.7 |
| 6,349,018 B2 | 2/2002 | Koishi et al. |
| 6,417,992 B2 * | 7/2002 | Sugimoto et al. .......... 360/236.2 |
| 6,459,552 B1 | 10/2002 | Liu et al. |
| 6,477,012 B1 | 11/2002 | Park et al. |
| 6,515,831 B1 * | 2/2003 | Sannino et al. ............. 360/235.6 |
| 6,567,373 B1 * | 5/2003 | Kato et al. ..................... 369/300 |
| 6,707,646 B2 * | 3/2004 | Berger et al. ............... 360/294.7 |
| 6,760,193 B1 * | 7/2004 | Kohira et al. ............... 360/236.3 |
| 6,765,765 B2 * | 7/2004 | Bement et al. .............. 360/294.3 |
| 6,785,096 B2 * | 8/2004 | Kuwajima et al. .......... 360/294.4 |
| 6,958,879 B2 * | 10/2005 | Oh et al. .......................... 360/75 |
| 6,963,473 B2 * | 11/2005 | Honda et al. ............... 360/294.7 |
| 7,061,722 B2 * | 6/2006 | Kohira et al. ............... 360/245.1 |
| 7,106,557 B2 * | 9/2006 | Kuwajima et al. .......... 360/294.4 |
| 7,617,737 B2 * | 11/2009 | Zhu et al. ........................ 73/800 |
| 7,652,851 B2 * | 1/2010 | Hashi et al. ................. 360/265.6 |

(Continued)

FOREIGN PATENT DOCUMENTS

JP 62270015 11/1987

(Continued)

OTHER PUBLICATIONS

He, Korth "Longitudinal Read Sensor for Magnetic Disks", *IBM Technical Disclosure Bulletin. Delphion.* Aug. 1990, 209-211.

(Continued)

*Primary Examiner* — Brian Miller

(57) ABSTRACT

Minimizing slider vibration effects on a magnetic transducer coupled to a slider are described herein. In one embodiment, a method is described for minimizing slider vibration effects on a magnetic transducer coupled to the slider. A mass component of the slider is adjusted such that at least one pitch nodal line and/or at least one roll nodal line of the slider approximately coincide with an intersection point, and the magnetic transducer is positioned to approximately coincide with the intersection point.

21 Claims, 10 Drawing Sheets

U.S. PATENT DOCUMENTS

| | | | |
|---|---|---|---|
| 7,804,665 B2 * | 9/2010 | Miyamoto et al. | 360/294.7 |
| 7,814,643 B2 * | 10/2010 | Johnson et al. | 29/603.03 |
| 2004/0130821 A1 | 7/2004 | Ohwe et al. | |
| 2004/0156148 A1 | 8/2004 | Chang et al. | |
| 2006/0132977 A1 * | 6/2006 | Ito | 360/234.7 |
| 2007/0086115 A1 * | 4/2007 | Harris et al. | 360/245.3 |
| 2007/0236838 A1 * | 10/2007 | Knigge et al. | 360/235.8 |
| 2008/0151430 A1 * | 6/2008 | Zhu et al. | 360/245.1 |
| 2009/0284869 A1 * | 11/2009 | Bandic et al. | 360/235.4 |

FOREIGN PATENT DOCUMENTS

| | | |
|---|---|---|
| JP | 63091817 | 4/1988 |
| JP | 1311412 | 12/1989 |
| JP | 2236812 | 9/1990 |
| JP | 2257411 | 10/1990 |
| JP | 6004827 | 1/1994 |
| JP | 2001236610 | 8/2001 |

OTHER PUBLICATIONS

Sano, et al., "A Low Inductance Metal-In-Gap Head Using a Side-Core Concept", *IEEE Transactions on Magnetics*, vol. 29, No. 6, Nov. 1993, 3888-3890.

* cited by examiner

MINIMIZING SLIDER VIBRATION EFFECTS ON A MAGNETIC TRANSDUCER

TECHNICAL FIELD

Embodiments of the present invention relate generally to the field of direct access storage devices and in particular to the performance of an air bearing surface (ABS) in conjunction with a magnetic transducer.

BACKGROUND

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Assembly (HDA) has undergone many changes.

Vibration can limit the performance of an HDA, and if uncontrolled can render an HDA inoperable. Various methods and systems for controlling vibration are well known in the art. These can range from vibration absorbent materials to extraneous systems such as shock absorbers and active vibration controls systems with feedback loops. When considering a method for controlling vibration, size, cost, and compatibility with the operating environment need to be considered. These considerations become particularly challenging in HDA technology.

SUMMARY OF THE INVENTION

Various embodiments of the present invention, minimizing slider vibration effects on a magnetic transducer coupled to a slider, are described herein. In one embodiment, a method is described for minimizing slider vibration effects on a magnetic transducer coupled to the slider. A mass component of the slider is adjusted such that at least one pitch nodal line and/or at least one roll nodal line of the slider approximately coincide with an intersection point, and the magnetic transducer is positioned to approximately coincide with the intersection point.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a overview of the effects vibration can have on an HDD, in particular the effects of vibration of the hard disk drive slider on the magnetic transducer and its performance. The discussion will then focus on embodiments of the present invention that mitigate slider vibration and the effects it has on magnetic transducer performance. The implementation of embodiments of the present invention will then be discussed.

Overview

Figure 1:
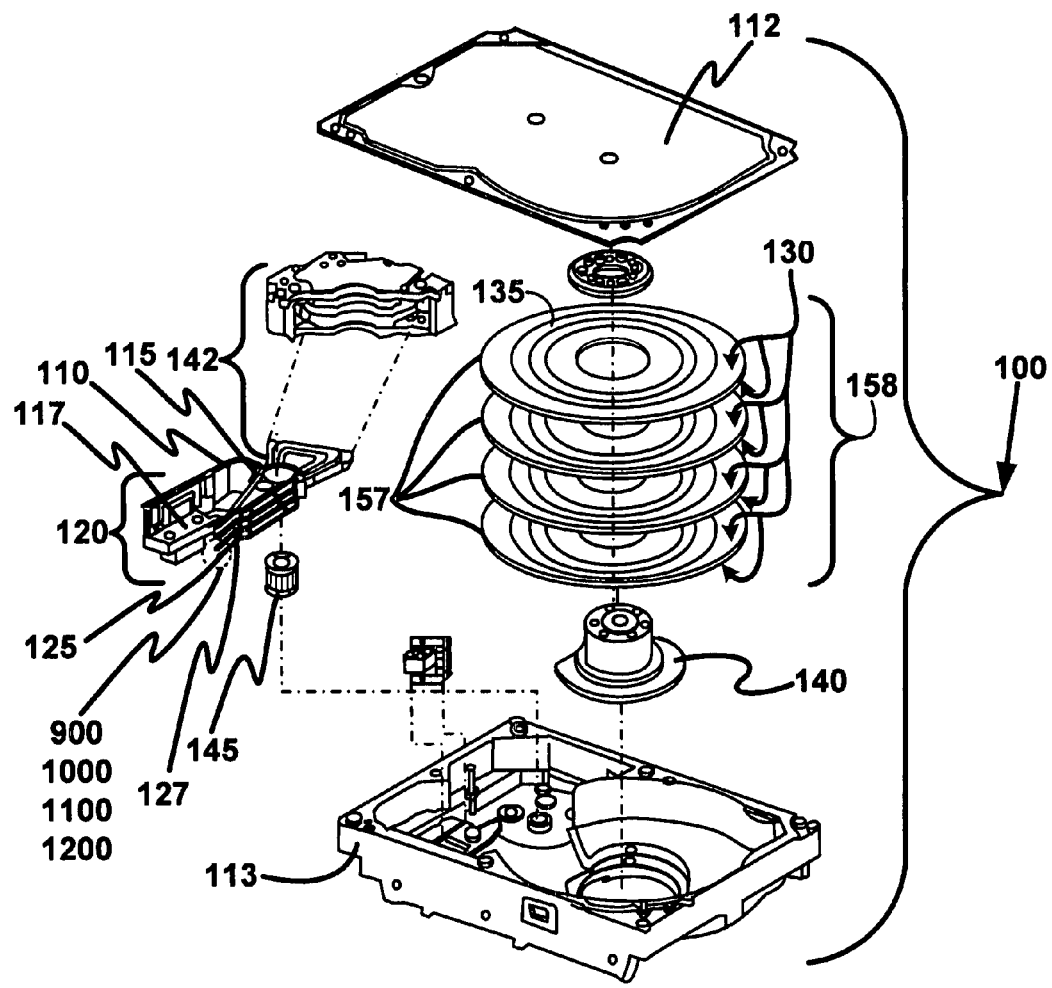
FIG. 1 is an isometric blow-apart of an HDD in accordance with an embodiment of the present invention.

With reference to FIG. 1, an isometric blow-apart of HDD 100 is shown in accordance with an embodiment of this invention. Base casting 113 provides coupling points for components and sub-assemblies such as disk stack 158, voice coil motor (VCM) 142, and actuator assembly 120. Disk stack 158 is coupled to base casting 113 by means of motor-hub assembly 140. Motor-hub assembly 140 will have at least one disk 157 coupled to it whereby disk 157 can rotate about an axis common to motor-hub assembly 140 and the center of disk 157. Disk 157 has at least one surface 130 upon which reside data tracks 135. Actuator assembly 120 comprises suspension 127, which suspends hard disk drive slider 125 next to disk surface 130, and connector 117, which conveys data between arm electronics (A/E) 115 and a host system wherein HDD 100 resides. Flex cable 110, which is part of actuator assembly 120, conveys data between connector 117 and A/E 115.

Actuator assembly 120 is coupled pivotally to base casting 113 by means of pivot bearing 145, whereby VCM 142 can move HDD slider 125 arcuately across data tracks 135. Upon assembly of actuator assembly 120, disk stack 158, VCM 142, and other components with base casting 113, cover 112 is coupled to base casting 113 to enclose these components and sub-assemblies into HDD 100.

HDD slider 125 is designed to fly in very close proximity to the disk surface 130. For instance, in some systems the HDD slider may be designed to fly only three to five nanometers above the disk surface. In a system with such close tolerances, components can be subject to van der Waals, meniscus, electrostatic, spindle motor charge up, and contact potential forces. These forces are due to a variety of causes, such as: the molecular attraction of components in very close proximity; adhesive friction caused by contact between the HDD slider and the lubricant on the disk; the build up of electrical potential between the disk and the HDD slider caused by the rotating disk surface (tribo-charging); the build up of electrical potential in motor bearings (tribo-charging); potential difference that exists between two different metals (different Fermi levels of HDD slider and disk material); and impacts between the HDD slider and disk surface. These forces alone, and in combination, create bouncing vibrations of the HDD slider which contribute to undesirable fluctuations of the fly-height of the HDD slider.

Bouncing vibrations of the HDD slider such as slider 125 are undesirable because they can cause damage to disk surface 130. Bouncing vibrations also cause variations in the magnetic spacing between the magnetic transducer and disk surface 130 (due to fluctuations in fly-height) that are likely to cause data errors—both hard errors during writing and soft errors during reading.

Figure 2A:
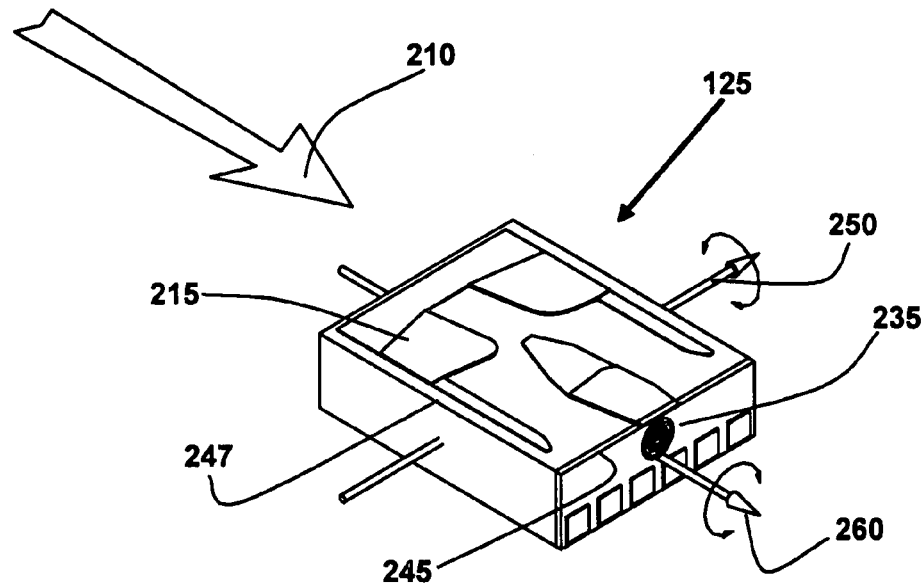
FIGS. 2A and 2B are an isometric and a plan view of a hard disk drive slider upon which embodiments of the present invention can be practiced.
Figure 2B:
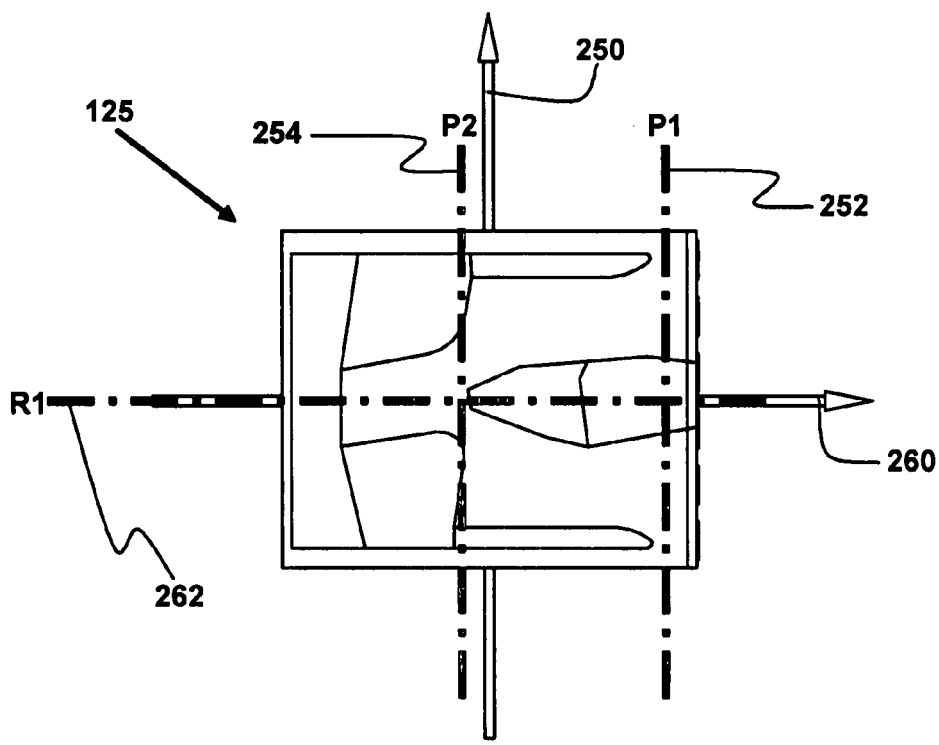

FIG. 2A and FIG. 2B are an isometric and a plan view of hard disk drive slider 125 upon which embodiments of the present invention can be practiced. HDD slider 125 comprises magnetic transducer 235, which writes and reads data tracks 135 onto disk surface 130, and air bearing surface (ABS) 215, which in cooperation with suspension 127 provides a proper balance of forces, whereby magnetic transducer 235 is closely spaced from disk surface 130 by a film of air.

Roll axis 260 and pitch axis 250 are defined with respect to the direction 210 in which disk 157 rotates. Roll axis 260 is approximately parallel to disk rotation direction 210. Pitch axis 250 is approximately perpendicular to disk rotation direction 210. Roll axis 260 and pitch axis 250 intersect at a point within HDD slider 125 typically known as the center of gravity, or CG. One skilled in the art will appreciate that for a symmetric body, such as HDD slider 125, its CG will be at its geometric center. The CG is that point in a body that all uniform forces, such as gravity, act upon. Non-uniform forces, such as the positive and negative forces generated by ABS 215, and air bearing vibration forces, react approximately through the CG of slider 125 to the load force from suspension 127.

Air bearing vibrations act on the HDD slider 125 in several modes. These modes are defined by the axes about which they approximately rotate. The rotational modes of vibration for slider 125 tend to act approximately about pitch axis 250 and roll axis 260. The operating constraints, which confine the motion of slider 125, e.g. disk surface 130, and suspension 127, may cause the pitch modes and roll modes of vibration to pivot about axes, which may not coincide with pitch axis 250 and roll axis 260. These axes of vibration are known as nodal lines (252, 254, 262).

In today's disk drives with pico-sized HDD sliders, the frequency range that includes the particular air bearing vibration modes of interest in the present invention is between approximately 50 kHz and approximately 500 kHz. In a typical pico HDD slider this frequency range substantially encompasses the second pitch mode of vibration, which has a center frequency of in the vicinity of 240 kHz to 250 kHz and tends to rotate slider 125 about P2 nodal line 254. The present invention is mainly concerned with mitigating bouncing vibrations in the second pitch mode. These "P2 mode" vibrations create the most problems with read/write errors and media damage.

Physical Description

Figure 3:
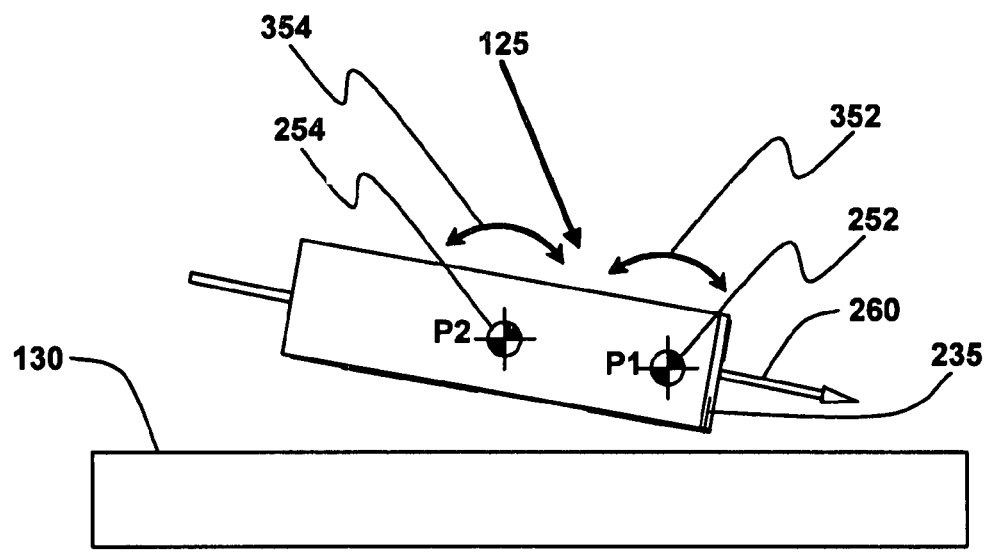
FIG. 3 is a side view of a hard disk drive slider upon which embodiments of the present invention can be practiced.

FIG. 3, is a side view of a hard disk drive slider upon which embodiments of the present invention can be practiced. Rotation 354 about P2 nodal line 254 will cause larger excursions of magnetic transducer 235 from disk surface 130 than rotation 352 about P1 nodal line 252. In accordance with an embodiment of the present invention P2 nodal line 254 is moved closer to P1 nodal line 252. In so doing the effects of slider vibration on magnetic transducer 235 are minimized.

A condition that minimizes slider vibration effects on magnetic transducer 235 is the condition in which all nodal lines intersect at a point that is coincident with magnetic transducer 235. Embodiments of the present invention provide methods and designs for adjusting a mass component of a slider such that at least one pitch nodal line and/or at least one roll nodal line of the slider approximately coincide with an intersection point. By positioning the magnetic transducer approximately coinciding with an intersection point of the nodal lines, rotational vibration of the slider is centered on the magnetic transducer thus having very little effect on the spacing of the magnetic transducer to the disk surface.

In accordance with an embodiment of the present invention, P2 nodal line 254 is moved closer to P1 nodal line 252 by forming ABS 215 so that the short axis of ABS 215 is aligned approximately parallel with a direction of rotation of disk 157. Magnetic transducer 235 is located on trailing edge 245 (as presented in FIG. 2a). In accordance with another embodiment of the present invention, magnetic transducer 235 is located on an edge orthogonal to trailing edge 245 and approximately parallel with a direction of rotation 210 of disk 157, such as orthogonal edge 847 (as presented in FIG. 8a). Magnetic transducer 235 is positioned at any location along trailing edge 245 or an orthogonal edge such as orthogonal edge 247 such that magnetic transducer 235 approximately coincides with an intersection point of at least one pitch nodal line and/or at least one roll nodal line.

Figure 4A:
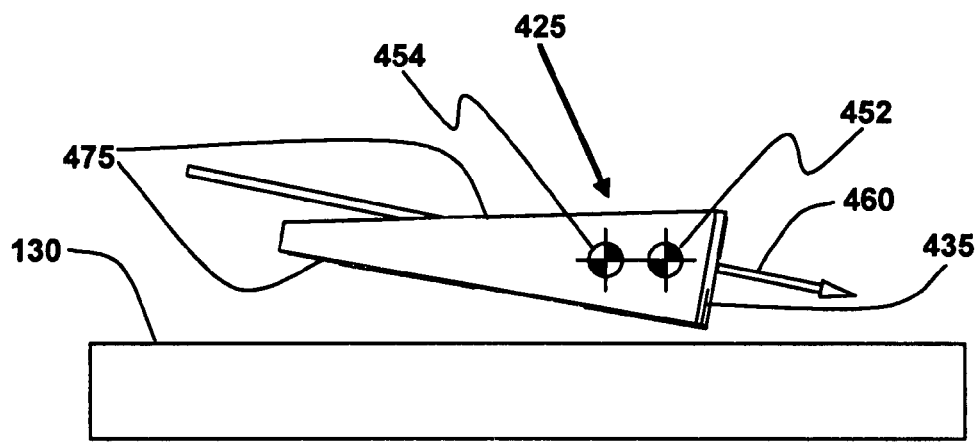
FIGS. 4A and 4B are a side view and an isometric view of a hard disk drive slider in accordance with an embodiment of the present invention.
Figure 4B:
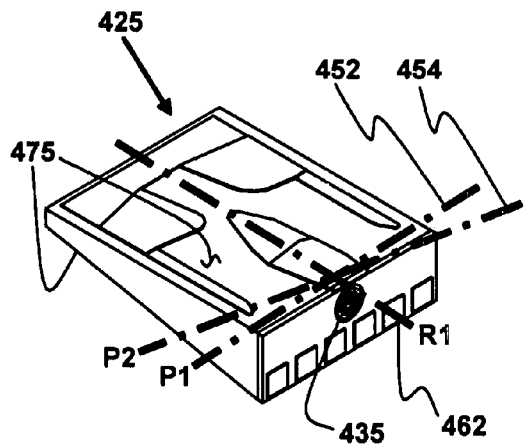

With reference to FIG. 4A and FIG. 4B, a side view and an isometric view of a hard disk drive slider 425 are presented in accordance with an embodiment of the present invention. Slider 425 comprises an asymmetric profile, such that slider 425 is asymmetric with respect to roll axis 460. In so doing the CG of slider 425 is closer to magnetic transducer 435. P2 nodal line 454 moves in accordance with several factors, including CG location, and moves closer to P1 nodal line 452 in accordance with the CG location.

In accordance with an embodiment of the present invention, opposite surfaces 475 are divergent with each other to greater than ten percent of a distance between each other. This divergence creates the desired asymmetric profile and reduces the mass of slider 425 towards the narrowest end of divergence. This reduction of mass causes the location of the CG and consequently P2 nodal line 454, to be closer to P1 nodal line 452 and magnetic transducer 435. With respect to FIG. 4B, and in accordance with an embodiment of the present invention, P1 nodal line 452, P2 nodal line 454, and R1 nodal line 462 intersect at a point that is approximately coincident with magnetic transducer 435.

Figure 5:
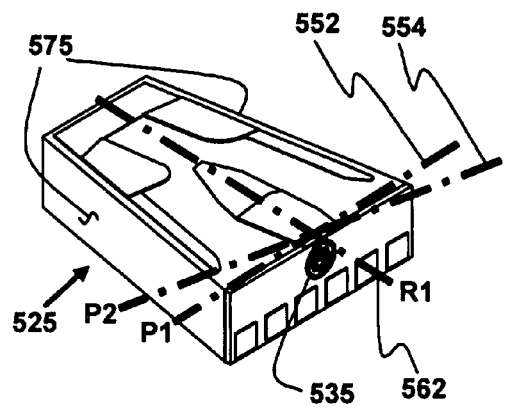
FIG. 5 is an isometric view of a hard disk drive slider in accordance with an embodiment of the present invention.

With reference to FIG. 5, an isometric view of hard disk drive slider 525 is presented in accordance with an embodiment of the present invention. Similarly as with the embodiment presented in FIG. 4B, slider 525 comprises an asymmetric profile, such that slider 525 is asymmetric with respect to its roll axis. In so doing the CG of slider 525 is closer to magnetic transducer 535. P2 nodal line 554 moves in accordance with several factors, including CG location, and moves closer to P1 nodal line 552 in accordance with the CG location.

In accordance with an embodiment of the present invention, opposite surfaces 575 are divergent with each other to greater than ten percent of a distance between each other. This divergence creates the desired asymmetric profile and reduces the mass of slider 525 towards the narrowest end of divergence. This reduction of mass causes the location of the CG and consequently P2 nodal line 554, to be closer to P1 nodal line 552 and magnetic transducer 535. With respect to FIG. 5, and in accordance with an embodiment of the present invention, P1 nodal line 552, P2 nodal line 554, and R1 nodal line 562 intersect at a point that is approximately coincident with magnetic transducer 535.

Figure 6:
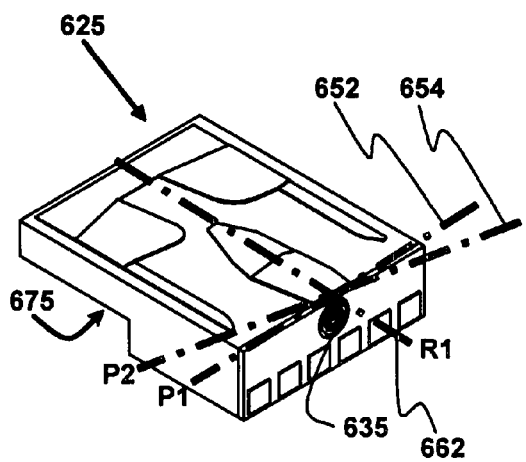
FIG. 6 is an isometric view of a hard disk drive slider in accordance with an embodiment of the present invention.

With reference to FIG. 6, an isometric view of a hard disk drive slider 625 is presented in accordance with an embodiment of the present invention. Slider 625 comprises an asymmetric profile, such that slider 625 is asymmetric with respect to its roll axis. In so doing the CG of slider 625 is closer to magnetic transducer 635. P2 nodal line 654 moves in accordance with several factors, including CG location, and moves closer to P1 nodal line 652 in accordance with the CG location.

In accordance with an embodiment of the present invention, at least one notch 675 is incorporated in slider 625. Notch 675 creates the desired asymmetric profile and reduces the mass of slider 625 proximally. This reduction of mass causes the location of the CG and consequently P2 nodal line 654, to be closer to P1 nodal line 652 and magnetic transducer 635. In accordance with an embodiment of the present invention, P1 nodal line 652, P2 nodal line 654, and R1 nodal line 662 intersect at a point that is approximately coincident with magnetic transducer 635.

Figure 7:
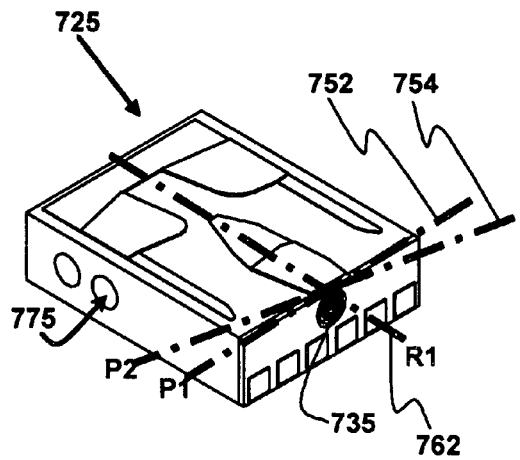
FIG. 7 is an isometric view of a hard disk drive slider in accordance with an embodiment of the present invention.

With reference to FIG. 7, an isometric view of a hard disk drive slider 725 is presented in accordance with an embodiment of the present invention. Slider 725 comprises an asymmetric profile, such that slider 725 is asymmetric with respect to its roll axis. In so doing the CG of slider 725 is closer to magnetic transducer 735. P2 nodal line 754 moves in accordance with several factors, including CG location, and moves closer to P1 nodal line 752 in accordance with the CG location.

In accordance with an embodiment of the present invention, at least one hole 775 is incorporated in slider 725. Hole 775 creates the desired asymmetric profile and reduces the mass of slider 725 proximally. This reduction of mass causes the location of the CG and consequently P2 nodal line 754, to be closer to P1 nodal line 752 and magnetic transducer 735. In accordance with an embodiment of the present invention, P1 nodal line 752, P2 nodal line 754, and R1 nodal line 762 intersect at a point that is approximately coincident with magnetic transducer 735.

Without detracting from the spirit of the embodiments of the present invention, it is appreciated that various shapes, sizes and depths of notches and holes are applicable to the embodiments of the present invention. For the sake of brevity and clarity, and for the purposes of example and not of limitation, only notch 675 and hole 775 are presented in FIG. 6 and FIG. 7 as examples of a wide variety of notches and holes which may be utilized by various embodiments.

Figure 8A:
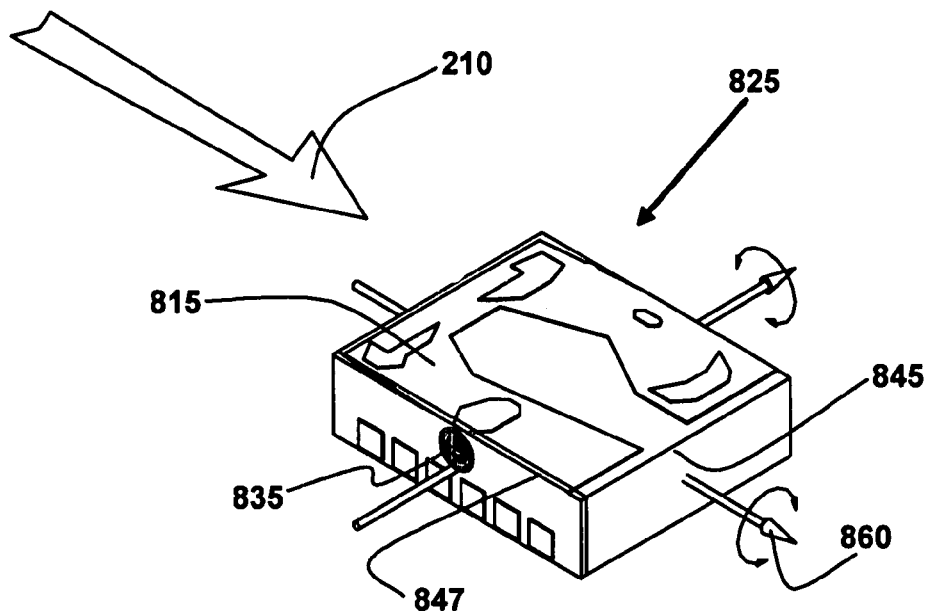
FIGS. 8A and 8B are an isometric and a plan view of a hard disk drive slider in accordance with an embodiment of the present invention.
Figure 8B:
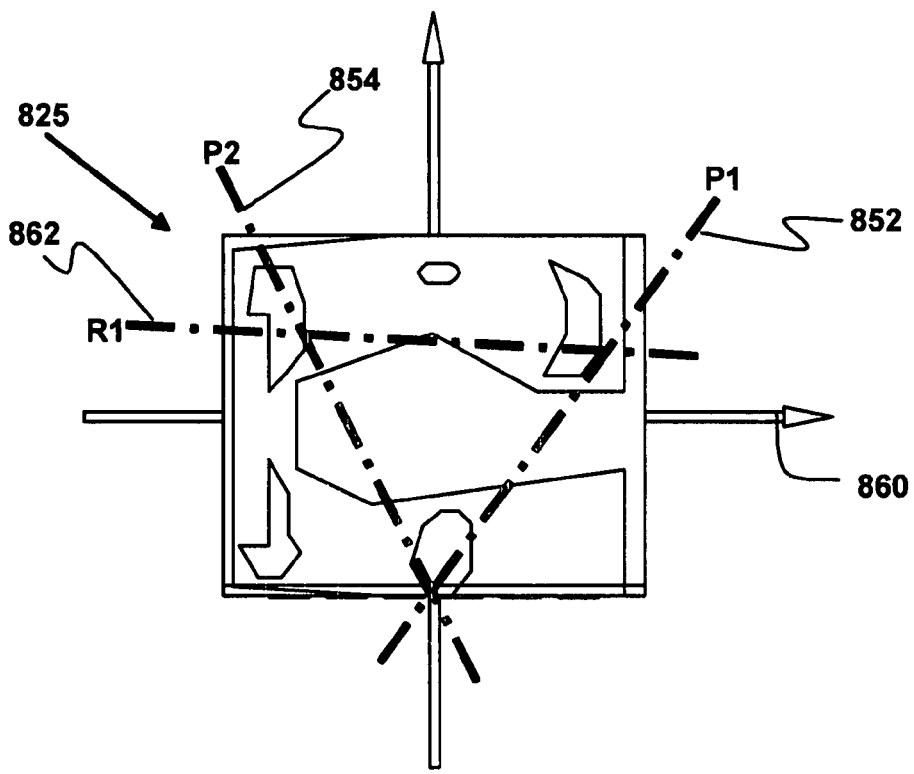

With reference to FIG. 8A and FIG. 8B, an isometric and a plan view of hard disk drive slider 825 are presented in accordance with an embodiment of the present invention. Magnetic transducer 835 is located on edge 847 orthogonal to trailing edge 845 and approximately parallel with a direction of rotation 210 of disk 157 and roll axis 860. Magnetic transducer 835 is positioned approximately coincidental with an intersection point of at least one pitch nodal line and/or at least one roll nodal line, such as P1 nodal line 852 and P2 nodal line 854, as exemplified in FIG. 8B.

In accordance with another embodiment of the present invention, ABS (215, 815) comprises a zone configured to create high pressure. This high pressure zone approximately coincides with magnetic transducer (235, 835) during operation of HDD 100. It is well known to those skilled in the art that various configurations of ABS (215, 815) are possible which produce a zone that creates a high pressure zone. In accordance with an embodiment of the present invention, such a high pressure zone is located approximately coincidental with magnetic transducer (235, 835).

Figure 9A:
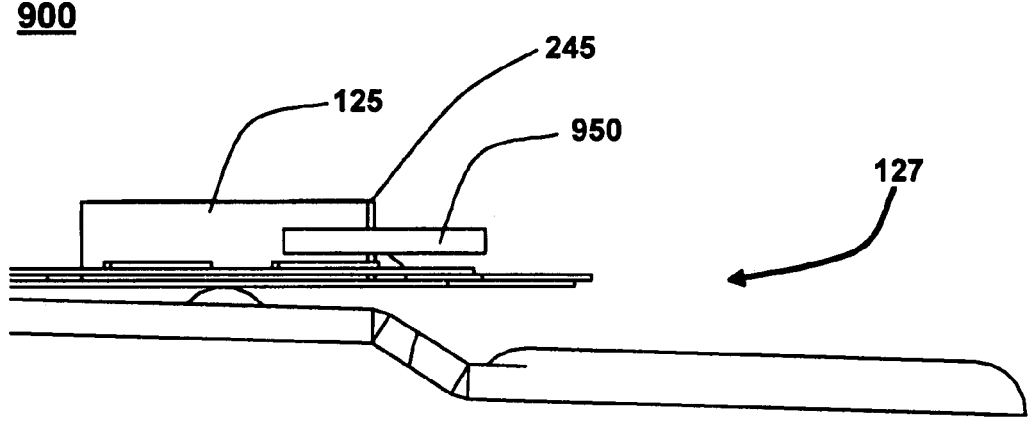
FIGS. 9A and 9B are a side view and an isometric of a detail of a head gimbal assembly in accordance with an embodiment of the present invention.
Figure 9B:
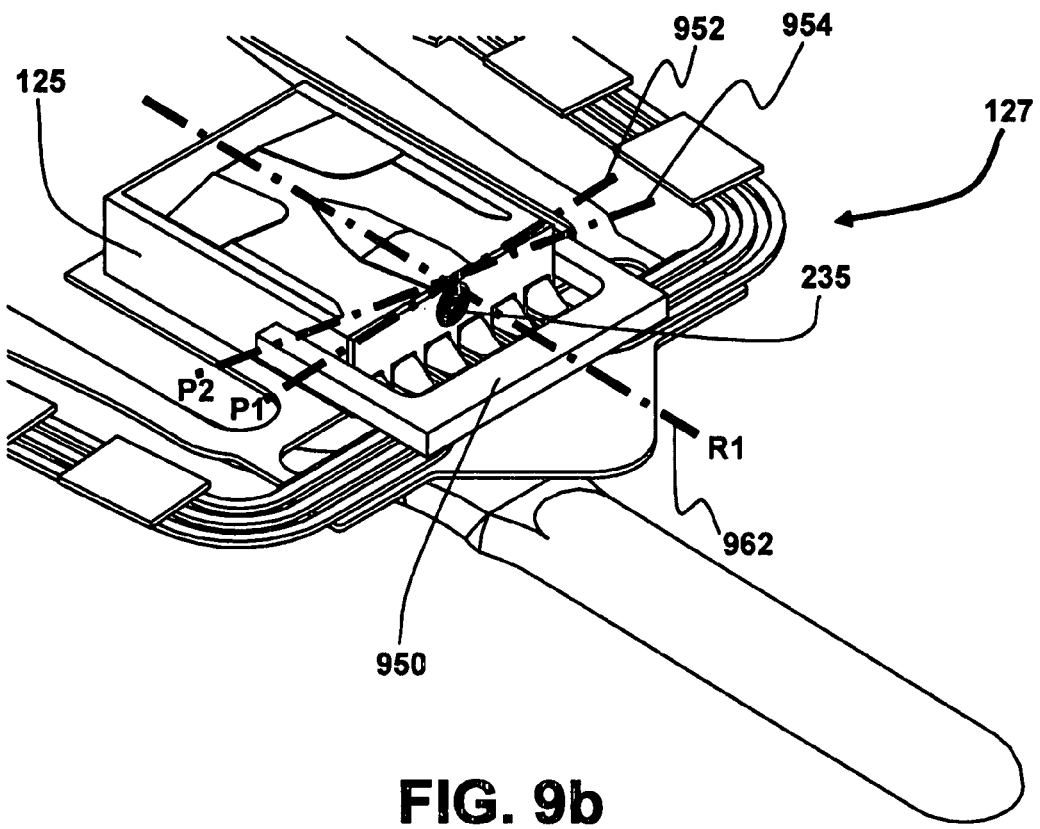

With reference to FIG. 9A and FIG. 9B, a side view and an isometric of detail 900 of a head gimbal assembly are presented in accordance with an embodiment of the present invention. Detail 900 is the distal end of a head gimbal assembly of HDD 100, comprising HDD slider 125 and suspension 127. Mass 950 is coupled to slider 125, such that the CG of mass 950 is beyond trailing edge 245 of slider 125. In so coupling, the combined CG of mass 950 and slider 125 is close to trailing edge 245, which in turn results in P2 nodal line 954 and P1 nodal line 952 to move to within, for example 100 microns of each other and magnetic transducer 235, and in some cases to intersect close to magnetic transducer 235.

Figure 10A:
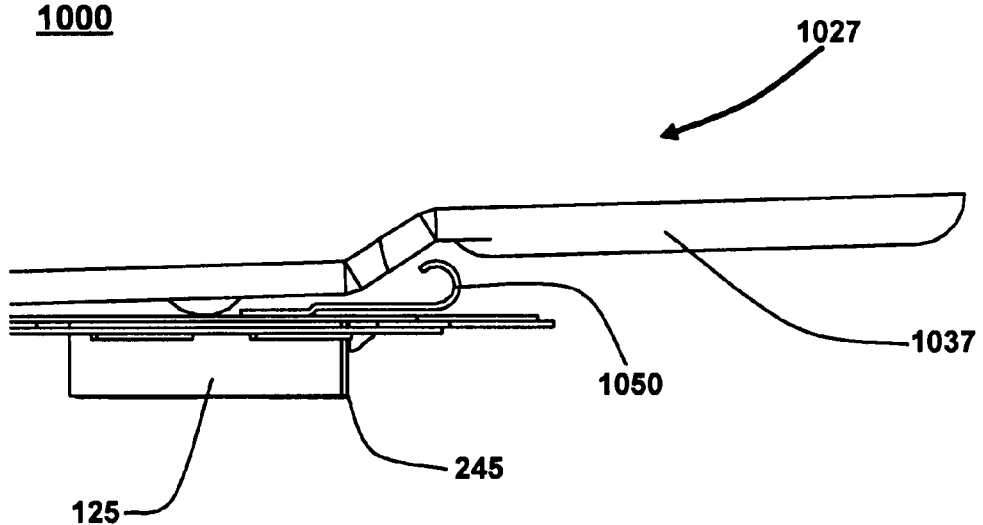
FIGS. 10A and 10B are a side view and an isometric of a detail of a head gimbal assembly in accordance with an embodiment of the present invention.
Figure 10B:
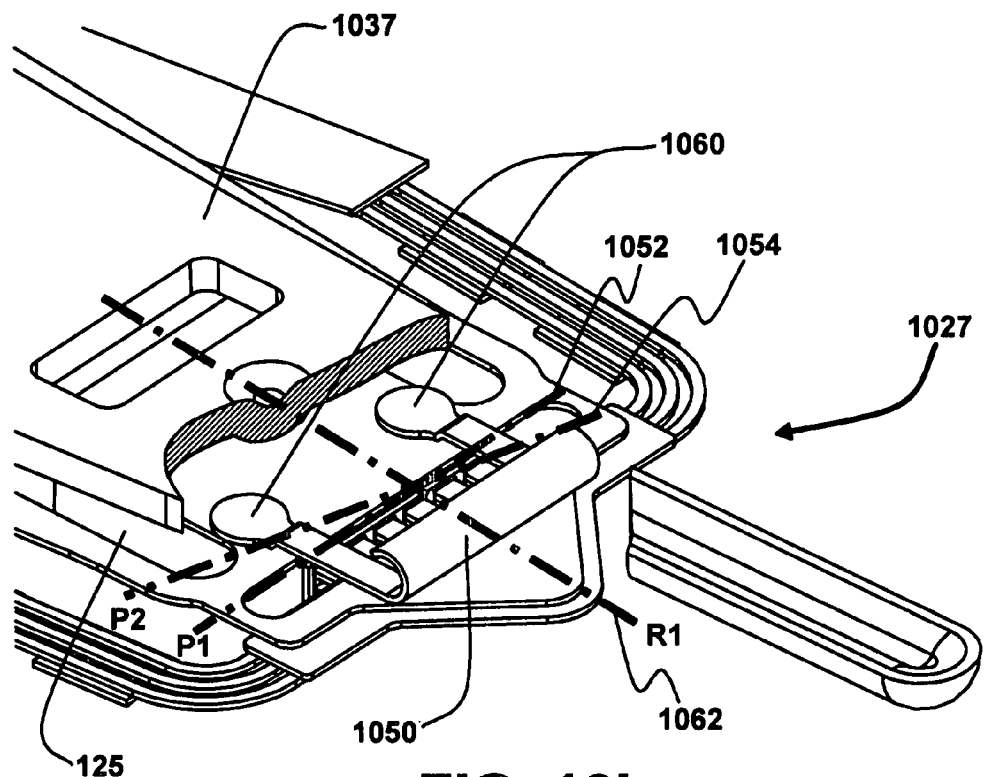

With reference to FIG. 10A and FIG. 10B, a side view and an isometric of detail 1000 of a head gimbal assembly are presented in accordance with an embodiment of the present invention. Detail 1000 is the distal end of a head gimbal assembly of HDD 100, comprising HDD slider 125 and suspension 1027. Mass 1050 is coupled to suspension 1027, to which slider 125 is coupled, such that the CG of mass 1050 is beyond trailing edge 245 of slider 125. In so coupling, the combined CG of mass 1050 and slider 125 is close to trailing edge 245, which in turn results in P2 nodal line 1054 and P1 nodal line 1052 intersecting close to magnetic transducer 235. A section of load beam 1037 is removed from FIG. 10B to provide visibility to coupling points 1060 of mass 1050.

Figure 11:
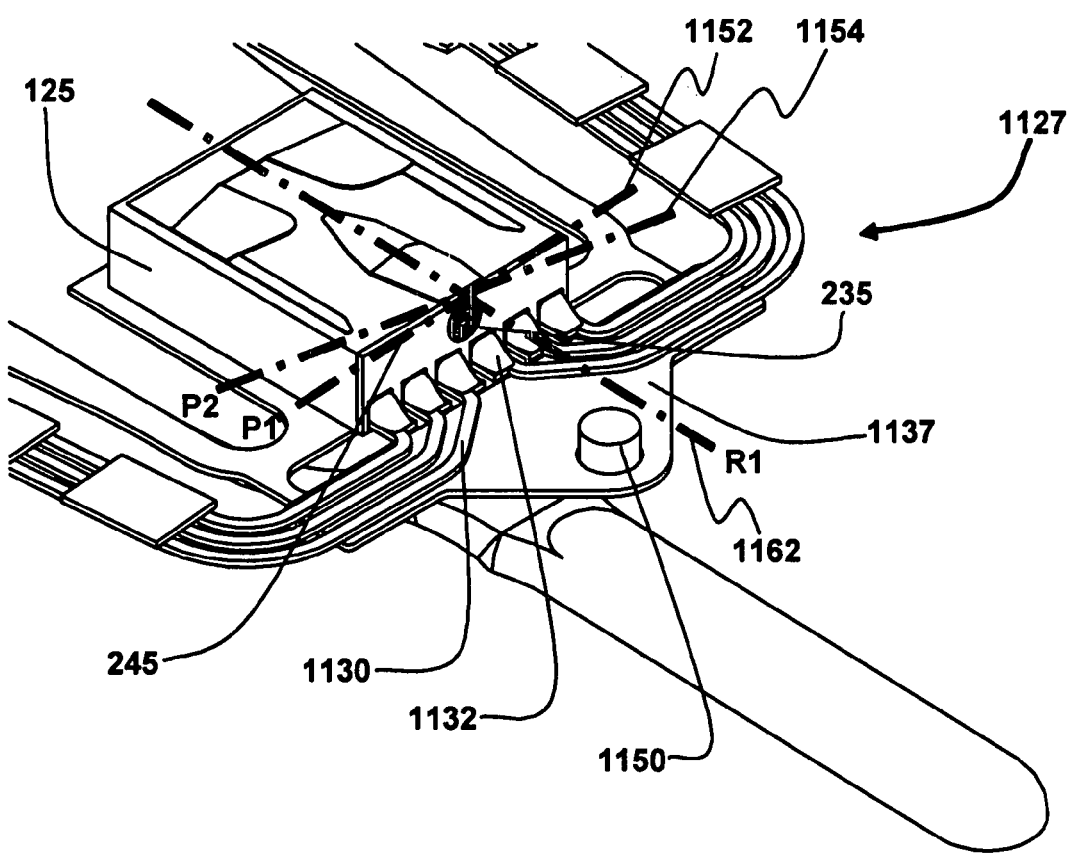
FIG. 11 is an isometric of a detail of a head gimbal assembly in accordance with an embodiment of the present invention.

With reference to FIG. 11, an isometric of detail 1100 of a head gimbal assembly is presented in accordance with another embodiment of the present invention. Detail 1100 is the distal end of a head gimbal assembly of HDD 100, comprising HDD slider 125 and suspension 1127. Mass 1150 is coupled to suspension 1127, to which slider 125 is coupled, such that the CG of mass 1150 is beyond trailing edge 245 of slider 125. Mass 1150 is coupled to a feature of suspension 1127, typically known as "nose" 1137. In so coupling, the combined CG of mass 1150 and slider 125 is close to trailing edge 245, which in turn results in P2 nodal line 1154 and P1 nodal line 1152 to move to within, for example 100 microns of each other and magnetic transducer 235, and in some cases to intersect close to magnetic transducer 235.

It should be appreciated to one skilled in the art that there are numerous configurations and methods for attaching mass 1150 to nose 1137. For example, a separate mass of any shape, shown as a cylinder in FIG. 11, can be coupled to nose 1137 by any number of attachment methods such as adhesive, solder, and welding. Another example of coupling a mass to nose 1137, is to leave material typically removed from the fabrication of suspension 1127, such as material used for fabricating conductor 1130, on nose 1137. Another example of coupling a mass to nose 1137, is to apply a pad of solder 1132, which is typically applied to suspension 1127 for electrical termination, on nose 1137.

Figure 12A:
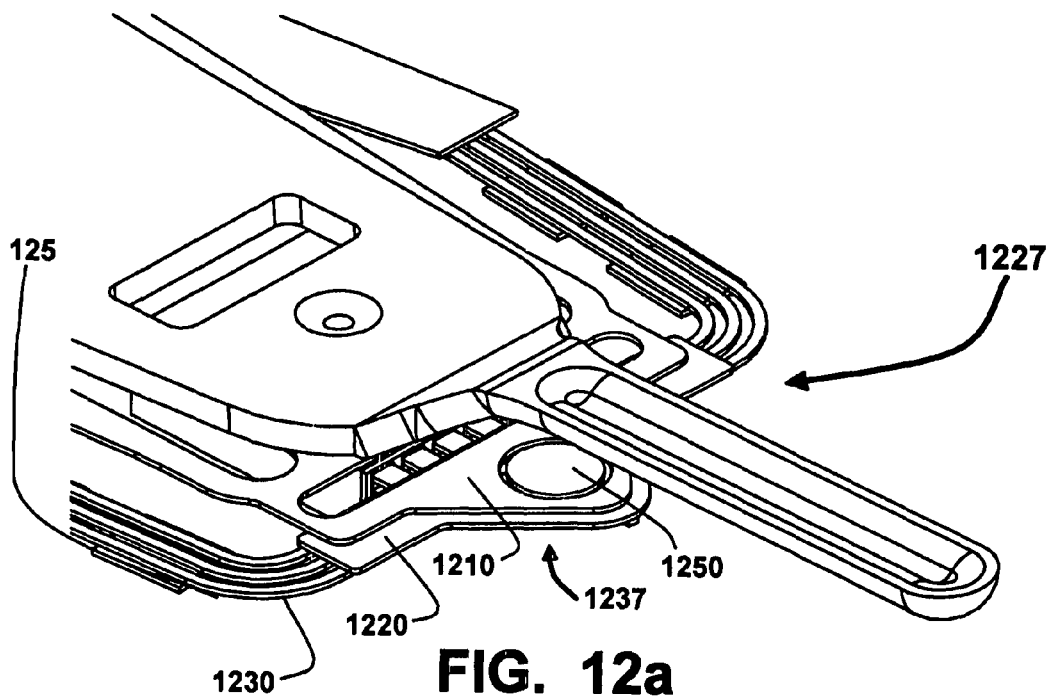
FIGS. 12A and 12B are a front and a back isometric of a detail of a head gimbal assembly in accordance with an embodiment of the present invention.
Figure 12B:
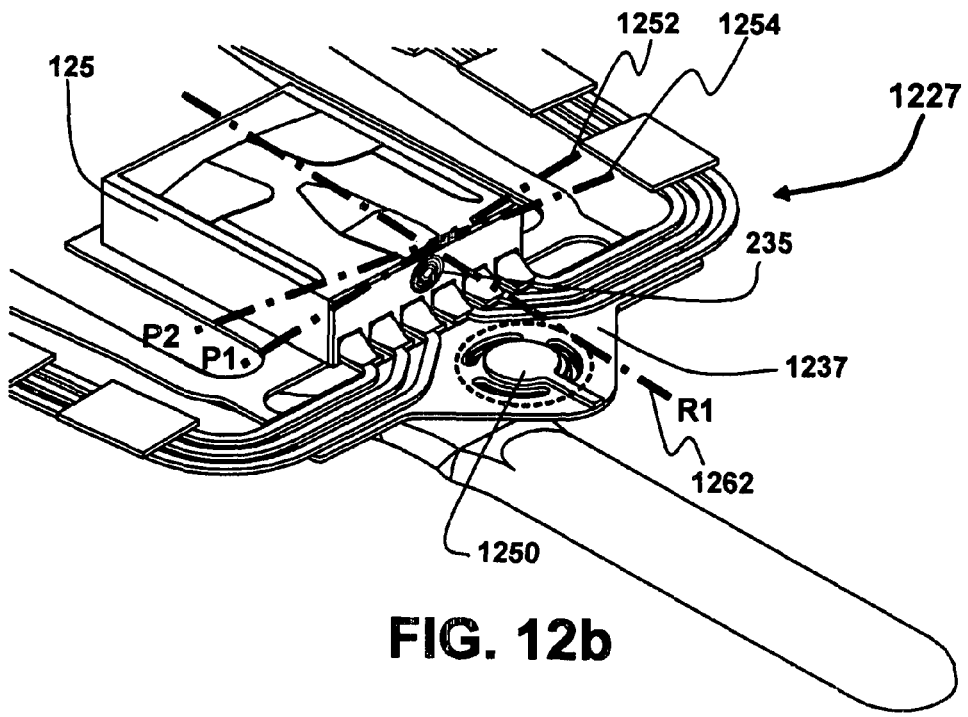

With reference to FIG. 12A and FIG. 12B, a front and a back isometric of detail 1200 of a head gimbal assembly are presented in accordance with an embodiment of the present invention. Detail 1200 is the distal end of a head gimbal assembly of HDD 100, comprising HDD slider 125 and suspension 1227. Mass 1250 is shown as a tuned mass damper. Tuned mass damper 1250 vibrates out of phase to vibrations that act upon slider 125. The concept of a tuned mass damper is known in the art. Tuned mass damper 1250 is fabricated as part of nose 1237 and suspension 1227. It should be appreciated that the dimensions of the features that define tuned mass damper 1250 are variable and are determined by the response that is desired from tuned mass damper 1250. Tuned mass damper 1250 presented in FIG. 12A and FIG. 12B is not intended to represent the myriad of shapes and configurations possible. Tuned mass damper 1250 is presented for brevity and clarity and is only exemplary of a tuned mass damper.

In accordance with an embodiment of the present invention, tuned mass damper 1250 is fabricated simultaneously with nose 1237. Support layer 1210, insulator layer 1220, and conductor layer 1230 are defined with photolithographic processes well known in the art to fabricate the features of tuned mass damper 1250. In addition to the inherent mass associated with features fabricated using support layer 1210, insulator layer 1220, and conductor layer 1230, in accordance with an embodiment of the present invention, additional mass is coupled to tuned mass damper 1250 by any number of attachment methods such as adhesive, solder, and welding. Another example of coupling a mass to tuned mass damper 1250 is to apply a pad of solder, which is typically applied to suspension 1227 for electrical termination, to conductor layer 1230 comprising tuned mass damper.

Operation

Figure 13:
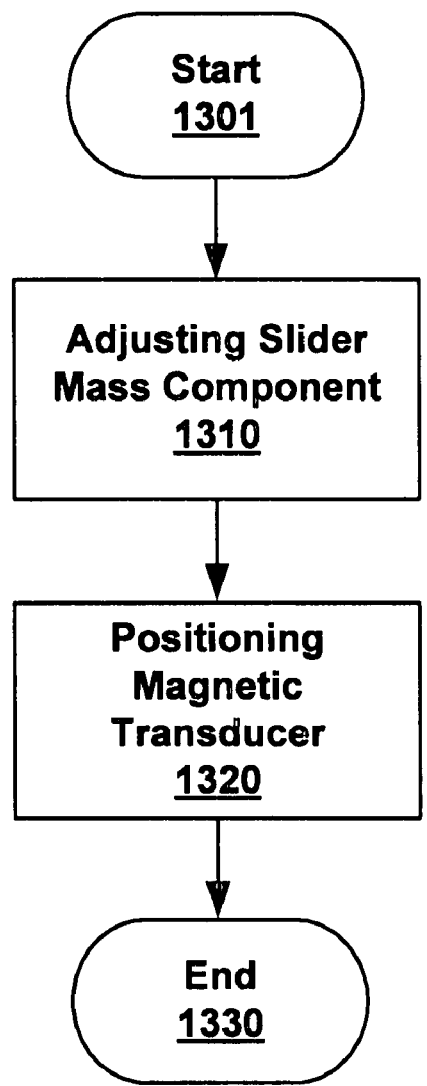
FIG. 13 is a flow chart illustrating a process for minimizing hard disk drive slider vibration effects on a magnetic transducer coupled to a hard disk drive slider in accordance with an embodiment of the present invention.

FIG. 13 is a flow chart illustrating process 1300 for minimizing hard disk drive slider vibration effects on a magnetic transducer coupled to a hard disk drive slider in accordance with an embodiment of the present invention. In one embodiment, process 1300 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 1300, such components are exemplary. That is, the embodiments of the present invention are well suited to performing various other components or variations of the components recited in FIG. 13. Within the present embodiment, it should be appreciated that the components of process 1300 may be performed by software, by hardware, by an assembly mechanism, through human interaction, or by any combination of software, hardware, assembly mechanism, and human interaction.

Process 1300 will be described with reference to elements shown in FIG. 4A, FIG. 4B, FIG. 5 through FIG. 7, FIG. 8A, FIG. 8B, FIG. 9A, FIG. 9B, FIG. 10A, FIG. 10B, FIG. 11, FIG. 12A, and FIG. 12B.

In one embodiment, as shown at 1301 of process 1300, an HDD slider is introduced into process 1300. An HDD slider that is suitable for process 1300 is a slider comprising a magnetic transducer and an ABS.

In one embodiment, as shown at 1310 of process 1300, a slider mass component of an HDD slider is adjusted. With reference to FIG. 4A, FIG. 4B, and FIG. 5 through FIG. 7, a slider mass component is adjusted by fabricating HDD slider (425, 525, 625, and 725) to comprise an asymmetric profile with respect to an HDD slider axis. HDD slider (425, 525) comprises an asymmetric profile by forming slider (425, 525) with opposite surfaces (475, 575) which are divergent to greater than ten percent of a distance between opposite surfaces (475, 575). HDD slider 625 comprises an asymmetric profile by incorporating at least one notch 675 in slider 625. HDD slider 725 comprises an asymmetric profile by incorporating at least one hole 775 in slider 725.

In another embodiment, a slider mass component of an HDD slider is adjusted by coupling an air bearing surface to an HDD slider wherein a short axis of the air bearing surface is aligned approximately parallel with a direction of a disk rotation.

With reference to FIG. 9A and FIG. 9B, and in accordance with an embodiment of the present invention, a slider mass component of HDD slider 125 is adjusted by adding a mass to HDD slider 125. With reference to FIG. 10A, FIG. 10B, and FIG. 11 and in accordance with embodiments of the present invention, a slider mass component of HDD slider 125 is adjusted by adding a mass to suspension (1027, 1127, 1227) wherein HDD slider 125 is coupled.

In so adjusting the mass component of HDD slider (125, 425, 525, 625, and 725), at least one pitch nodal line and/or at least one roll nodal line of HDD slider (125, 425, 525, 625, and 725) approximately coincide with an intersection point.

In one embodiment, as shown at 1320 of process 1300, magnetic transducer (235, 435, 535, 635, 735, 835) is positioned to approximately coincident with an intersection point of P1 nodal line (252, 452, 552, 652, 752, 852, 952, 1052, 1152, 1252), and/or P2 nodal line (254, 454, 554, 654, 754, 854, 954, 1054, 1154, 1254), and/or R1 nodal line (262, 462, 562, 662, 762, 862, 962, 1062, 1162, 1262).

In one embodiment, as shown at 1330 of process 1300, the minimizing of slider vibration effects on a magnetic transducer coupled to the slider are complete and the slider exits process 1300.

The present invention, in the various presented embodiments allows for minimizing slider vibration effects on a magnetic transducer coupled to a slider and thus improve the dynamic response and reliability of an HDD slider and head gimbal assembly. One of ordinary skill in the art will appreciate that the HDD slider and suspension are designed in concert to produce a head gimbal assembly that improves dynamics which carries forward into a better performing HDD.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of minimizing slider vibration effects on a magnetic transducer coupled with said slider, said method comprising:
    providing an adjustable single mass component to a trailing edge of said slider;
    adjusting said single mass component of said slider such that at least two non-perpendicular vibration nodal lines of said slider approximately cross at an intersection point; and
    positioning said magnetic transducer with respect to said slider to approximately coincide with said intersection point.

2. The method of claim 1, wherein said adjusting comprises:
    forming said slider to comprise an asymmetric profile, such that said slider is asymmetric with respect to an axis of said slider.

3. The method of claim 2, wherein said forming said slider to comprise an asymmetric profile comprises:
    incorporating at least one hole in said slider.

4. The method of claim 2, wherein said forming said slider to comprise an asymmetric profile comprises:
    incorporating at least one notch in said slider.

5. The method of claim 2, wherein said forming said slider to comprise an asymmetric profile comprises:
    forming said slider with opposite surfaces which are divergent to greater than ten percent of a distance between said opposite surfaces.

6. A slider for a hard disk drive, said slider comprising:
    an adjustable single mass component coupled with a slider body at a trailing edge of said slider and configured, such that at least two non-perpendicular vibration nodal lines of said slider approximately coincide with an intersection point; and
    a magnetic transducer is approximately coincident with said intersection point.

7. The slider of claim 6, wherein said slider body comprises:
    an asymmetric profile with respect to an axis of said slider.

8. The slider of claim 7, further comprising:
    at least one hole, said at least one hole contributing to an asymmetry of said asymmetric profile.

9. The slider of claim 7, further comprising:
    at least one notch, said at least one notch contributing to an asymmetry of said asymmetric profile.

10. The slider of claim 6, wherein said slider body comprises:
    a first surface; and
    a second surface opposing said first surface such that said first surface and said second surface are divergent to greater than ten percent of a distance between said first surface and said second surface.

11. The slider of claim 6, wherein said mass comprises:
a tuned mass damper.

12. A hard disk drive comprising:
    a base casting for providing coupling points for components and sub-assemblies of said hard disk drive;
    a motor-hub assembly to which at least one disk is coupled allowing rotation of said disk about an axis approximately perpendicular and centered to said disk, wherein said motor-hub assembly is coupled to said base casting, wherein said disk comprises at least one surface of data tracks; and
    a slider coupled to said base casting by means of a suspension and an actuator such that said slider is arcuately moved across said data tracks, said slider comprising:
    an adjustable single mass component coupled with a slider body at a trailing edge of said slider and body configured, such that at least two non-perpendicular vibration nodal lines of said slider approximately coincide with an intersection point; and
    a magnetic transducer for conveying data to and from said data tracks, said magnetic transducer coupled approximately coincident with said intersection point.

13. The hard disk drive of claim 12, wherein said slider further comprising:
    an air bearing surface wherein a short axis of said air bearing surface is aligned approximately parallel with a direction of said disk rotation.

14. The hard disk drive of claim 13, wherein said air bearing surface further comprises:
    a zone configured to create high pressure during operation of said disk drive, said zone located approximately coincidental with said magnetic transducer.

15. The hard disk drive of claim 12, wherein said slider body comprises:
    an asymmetric profile with respect to an axis of said slider.

16. The hard disk drive of claim 15 wherein said asymmetric profile comprises:
    at least one hole in said slider body, said hole contributing to said asymmetry.

17. The hard disk drive of claim 15 wherein said asymmetric profile comprises:
    at least one notch in said slider body, said notch contributing to said asymmetry.

18. The hard disk drive of claim 12, wherein said slider body comprises:
    a first surface; and
    a second surface opposing said first surface such that said first surface and said second surface are divergent to greater than ten percent of a distance between said first surface and said second surface.

19. The hard disk drive of claim 12, wherein said magnetic transducer is aligned approximately parallel with a direction of said disk rotation.

20. The hard disk drive of claim 19, wherein said air bearing surface further comprises:
    a zone configured to create high pressure during operation of said disk drive, said zone located approximately coincidental with said magnetic transducer.

21. The hard disk drive of claim 12, wherein said mass comprises:
    a tuned mass damper.

* * * * *